(12) United States Patent
Wagger

(10) Patent No.: US 10,329,725 B2
(45) Date of Patent: Jun. 25, 2019

(54) SNOW GROOMER AND RELATIVE CONTROL METHOD

(75) Inventor: Klaus Wagger, Brunico (IT)

(73) Assignee: PRINOTH S.P.A., Vipiteno (IT)

( * ) Notice: Subject to any disclaimer, the term of this patent is extended or adjusted under 35 U.S.C. 154(b) by 432 days.

(21) Appl. No.: 13/512,714

(22) PCT Filed: Nov. 30, 2010

(86) PCT No.: PCT/IB2010/003062
§ 371 (c)(1),
(2), (4) Date: Aug. 7, 2012

(87) PCT Pub. No.: WO2011/067651
PCT Pub. Date: Jun. 9, 2011

(65) Prior Publication Data
US 2013/0138304 A1 May 30, 2013

(30) Foreign Application Priority Data
Dec. 1, 2009 (IT) .............................. MI2009A2119

(51) Int. Cl.
*E01H 4/02* (2006.01)
*E02F 9/22* (2006.01)
*B62D 55/02* (2006.01)
*B62D 55/00* (2006.01)

(52) U.S. Cl.
CPC .............. *E01H 4/02* (2013.01); *B62D 55/00* (2013.01); *B62D 55/02* (2013.01); *E02F 9/2235* (2013.01); *E02F 9/2296* (2013.01)

(58) Field of Classification Search
USPC ......................................................... 701/50
See application file for complete search history.

(56) References Cited

U.S. PATENT DOCUMENTS

| 4,739,616 | A | * | 4/1988 | Myers ............................. 60/420 |
| 5,142,800 | A | | 9/1992 | Hales et al. |
| 5,259,192 | A | * | 11/1993 | Karakama et al. ............. 60/422 |
| 5,911,506 | A | * | 6/1999 | Nakamura et al. ............. 37/348 |

(Continued)

FOREIGN PATENT DOCUMENTS

| EP | 0160195 | 11/1985 |
| EP | 1418275 | 5/2004 |

(Continued)

OTHER PUBLICATIONS

PCT Request (Form PCT/RO/101) for International Application No. PCT/IB2010/003062 dated Nov. 30, 2010.

(Continued)

*Primary Examiner* — Lail A Kleinman
(74) *Attorney, Agent, or Firm* — Neal, Gerber & Eisenberg LLP

(57) ABSTRACT

A snow groomer having a frame; an attachment connected movably to the frame; a hydraulic assembly having an actuator configured to position the attachment, and a valve configured to control the actuator; a variable-flow pump configured to supply the hydraulic assembly; and a control system configured to calculate the total flow rate demand of the hydraulic assembly, and configured to control the variable-flow pump as a function of the total flow rate demand, so delivery by the variable-flow pump equals the total flow rate demand.

32 Claims, 2 Drawing Sheets

(56) References Cited

U.S. PATENT DOCUMENTS

2003/0115866 A1* 6/2003 Price .............................. 60/431
2006/0129280 A1* 6/2006 Thomas et al. ............... 700/275
2007/0151237 A1* 7/2007 Hacker .......................... 60/445
2008/0065297 A1* 3/2008 Brickner et al. ................ 701/50

FOREIGN PATENT DOCUMENTS

| EP | 1770218 | 4/2007 |
| EP | 1995159 | 11/2008 |
| WO | 0036250 | 6/2000 |

OTHER PUBLICATIONS

Notification Concerning Submission, Obtention or Transmittal of Priority Document (Form PCT/IB/304) for International Application No. PCT/IB2010/003062 dated Feb. 17, 2011.
International Search Report and Written Opinion for International Application No. PCT/IB2010/003062 dated May 26, 2011.
First Notice Informing the Applicant of the Communication of the International Application (Form PCT/IB/308) for International Application No. PCT/IB2010/003062 dated Jul. 7, 2011.
Second and Supplementary Notice Informing the Applicant of the Communication of the International Application (Form PCT/IB/308) for International Application No. PCT/IB2010/003062 dated Apr. 5, 2012.

* cited by examiner

SNOW GROOMER AND RELATIVE CONTROL METHOD

PRIORITY CLAIM

This application is a national stage application of PCT/IB2010/003062, filed on Nov. 30, 2010, which claims the benefit of and priority to Italian Patent Application No. MI2009A 002119, filed on Dec. 1, 2009, the entire contents of which are each incorporated by reference herein.

BACKGROUND

Known snow groomers normally comprise a hydraulic control device connected to a pump; lines connecting the pump to an attachment hydraulic assembly; and an internal combustion engine connected to and for driving the pump.

In actual use, the pump is controlled by the hydraulic control device as follows:

- When the hydraulic assembly actuator is idle, the valve is closed and the pump is controlled by the hydraulic control device so that the pressure in the lines equals a standby pressure.
- When the hydraulic assembly actuator is active, the valve is open and the pressure in the lines falls below the standby pressure.
- When pressure falls below standby pressure, the hydraulic control device acts on the pump to deliver the maximum possible flow rate, which varies depending on the operating conditions, in particular the speed, of the internal combustion engine.

In other words, the instant the actuator is operated, the pump delivers the maximum flow rate, even if the actuator does not need it; in which case, the valve delivers the necessary flow rate to the actuator, and the difference between the maximum flow rate from the pump and the necessary flow rate is drained into a holding tank.

One drawback of certain known snow groomers lies in the pump delivering the maximum flow rate, even if the actual flow rate demanded by the actuator is lower.

Another drawback of certain known snow groomers lies in unnecessary operation of the pump, which consists in the valves draining surplus flow into the holding tank, and which subtracts energy from other groomer user devices.

Both drawbacks are compounded by the pump being configured to feed a plurality of hydraulic assemblies, and by each hydraulic assembly possibly comprising more than one valve.

SUMMARY

The present disclosure generally relates to a snow groomer for grooming ski slopes.

More specifically, one embodiment of the present disclosure relates to a snow groomer comprising a frame; at least one attachment connected movably to the frame; at least one hydraulic assembly comprising at least one actuator configured to position the attachment with respect to the frame, and at least one valve configured to control the actuator; and a pump configured to supply the hydraulic assembly.

It is one advantage of the present disclosure to provide a snow groomer configured to eliminate certain of the drawbacks of certain known snow groomers.

Another advantage of the present disclosure is to provide a snow groomer configured to reduce energy consumption.

Another advantage of the present disclosure is to reduce the degree of unnecessary operation (i.e., reduce the amount of flow drained into the holding tank).

According to one embodiment of the present disclosure, there is provided a snow groomer comprising a frame; at least one attachment connected movably to the frame; at least one hydraulic assembly comprising at least one actuator configured to position the attachment with respect to the frame, and at least one valve configured to control the actuator; a variable-flow pump configured to supply the hydraulic assembly; and a control system configured to calculate a total flow rate demand of the hydraulic assembly, and control the variable-flow pump as a function of the total flow rate demand, so, in at least one embodiment, delivery by the variable-flow pump approximately equals the total flow rate demand.

According to one embodiment of the present disclosure, the variable-flow pump is able to deliver a total flow rate that takes into account total flow rate demand, and so reduce energy consumption of the groomer.

Another advantage of the present disclosure is to provide a method of controlling a snow groomer, configured to eliminate the drawbacks of certain known snow groomers.

According to one embodiment of the present disclosure, there is provided a method of controlling a snow groomer, comprising the steps of:

- positioning at least one attachment, connected movably to a frame of the snow groomer, using a hydraulic assembly comprising at least one actuator configured to position the attachment, and at least one valve configured to control the actuator;
- supplying the hydraulic assembly using a variable-flow pump;
- calculating a total flow rate demand of the hydraulic assembly; and
- controlling the variable-flow pump as a function of the total flow rate demand, wherein, in at least one embodiment, delivery by the variable-flow pump approximately equals the total flow rate demand.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
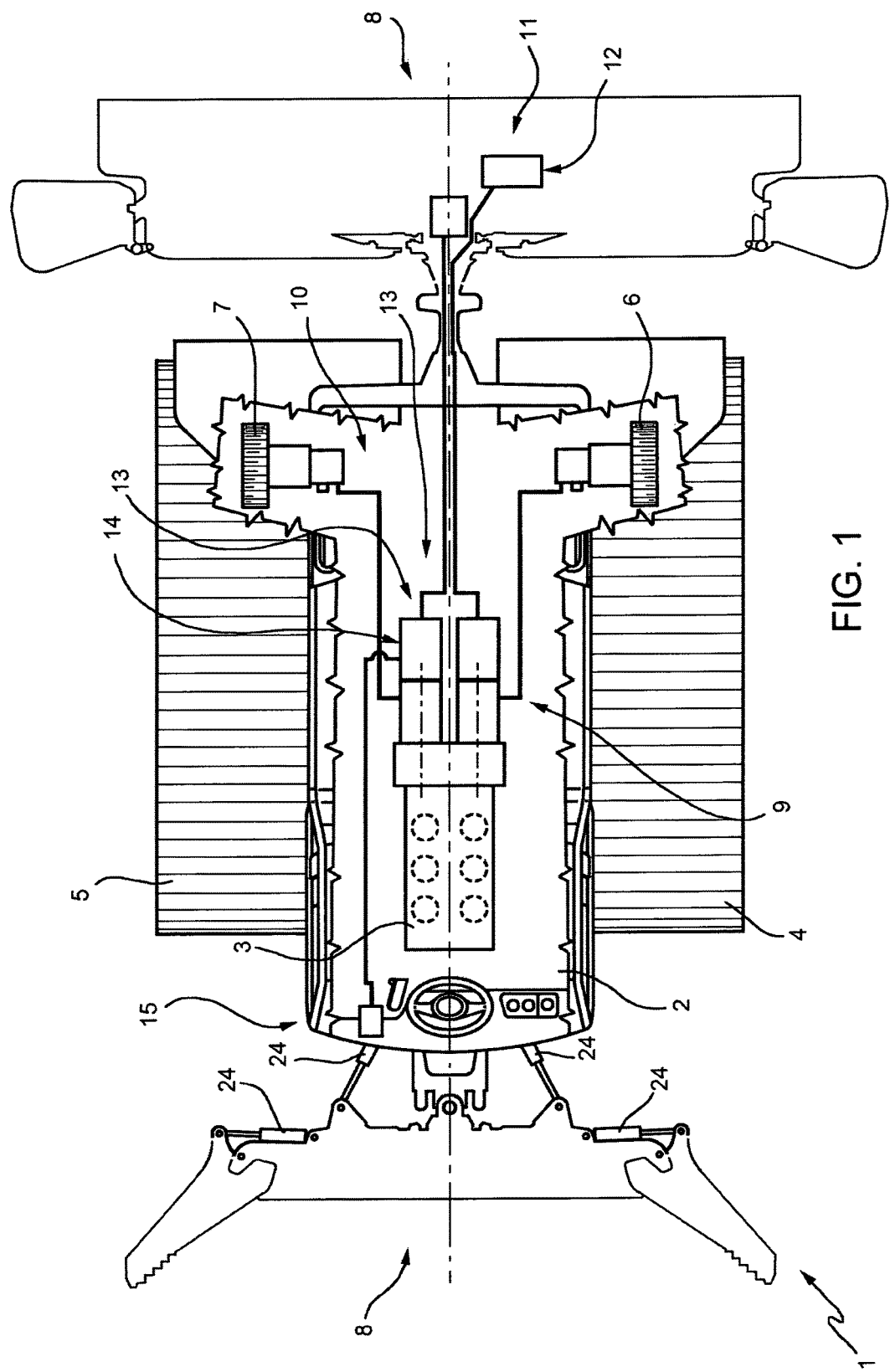
FIG. 1 shows a top plan view, with parts removed for clarity, of a snow groomer in accordance with the present disclosure.
Figure 2:
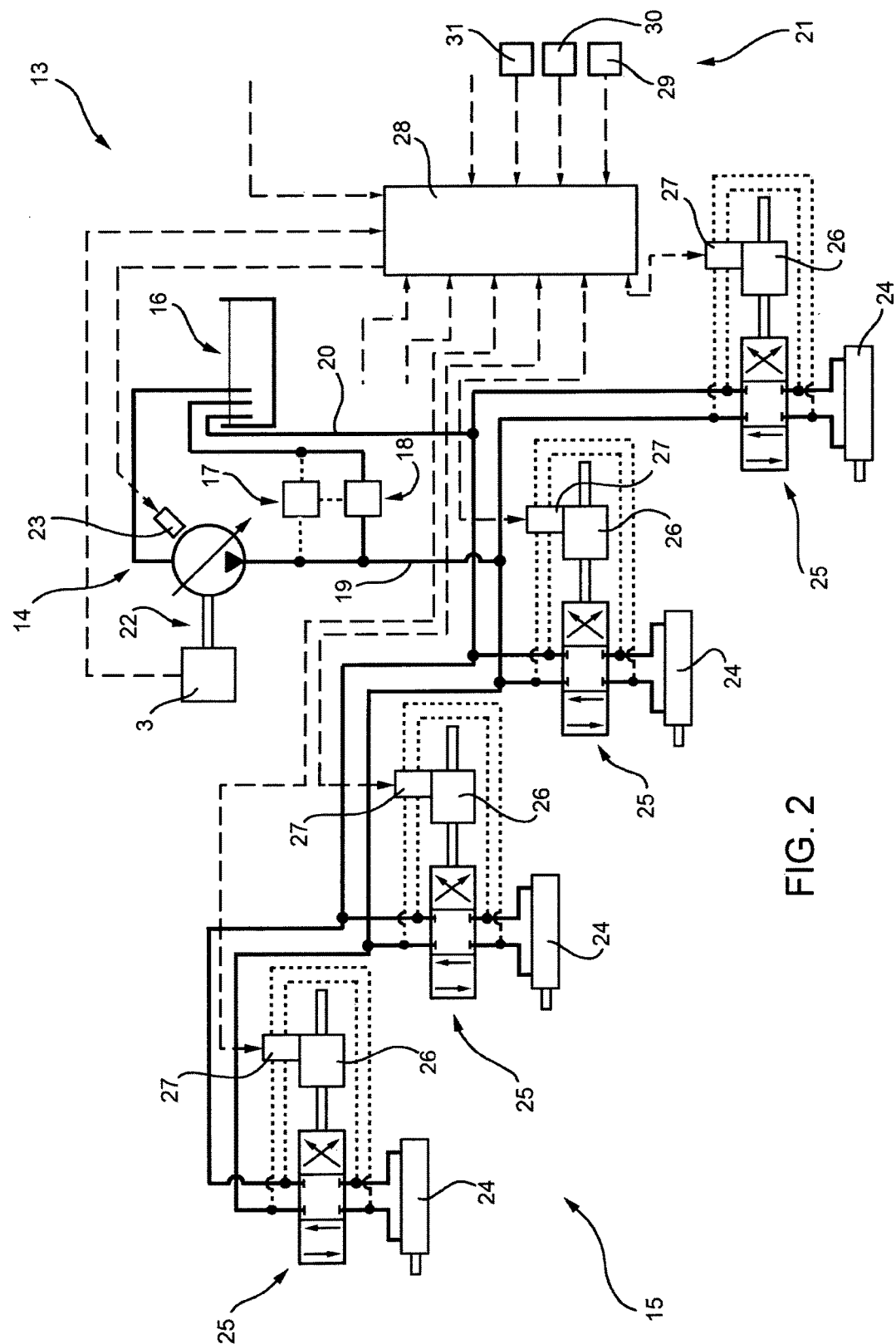
FIG. 2 shows a schematic view, with parts removed for clarity, of a detail of the FIG. 1 snow groomer.

Referring now to the example embodiments of the present disclosure illustrated in FIGS. 1 to 2, number 1 in FIG. 1 indicates as a whole a snow groomer configured to groom ski slopes, and which comprises a frame 2; an internal combustion engine 3; two independent tracks 4 and 5; two drive wheels 6 and 7 connected to respective tracks 4 and 5; a plurality of attachments 8; a hydraulic drive 9 configured to power drive wheel 6; a hydraulic drive 10 configured to power drive wheel 7; a hydraulic drive 11 configured to power a component 12; and a hydraulic drive 13 configured to position attachments 8.

In the example shown, attachments 8 comprise a shovel connected movably to frame 2; a tiller also connected movably to frame 2; and in at least one embodiment, a winch (not shown) connected movably to frame 2. Each of the accessories 8 described can assume a plurality of positions with respect to frame 2, and which are controlled by hydraulic drive 13. The tiller is equipped with the component 12—in the example shown, a rotary shaft—which is driven directly by dedicated hydraulic drive 11.

With reference to FIG. 2, hydraulic drive 13 comprises a variable-flow pump 14; a hydraulic assembly 15; a tank 16; a pressure sensor 17; a control valve 18; a delivery branch 19; and a return branch 20.

As seen in FIGS. 1 and 2, snow groomer 1 also comprises a control system 21 configured to control hydraulic drive 13.

Variable-flow pump 14 is powered by internal combustion engine 3 via a drive shaft 22, and is configured to deliver a maximum flow rate as a function of the speed of internal combustion engine 3. Variable-flow pump 14 comprises a regulating device 23 configured to adjust delivery between a minimum and maximum flow rate, regardless of the speed of internal combustion engine 3. For example, variable-flow pump 14 is a variable-eccentricity vane pump, in which regulating device 23 adjusts the eccentricity of the vanes as a function of a regulating signal from control system 21.

Hydraulic assembly 15 in FIG. 2 is associated with only one attachment 8 (e.g., the shovel), and comprises, for example, four actuators 24—in the example shown, double-acting hydraulic cylinders—which are configured to position attachment 8; and four valves 25—in the example shown, four-way, three-position slide valves—which are configured to control actuators 24.

Each valve 25 is associated with a respective actuator 24, and comprises a servocontrol 26, and a block 27 configured to control valve 25 and servocontrol 26. Block 27 of valve 25 is configured to determine the flow rate between valve 25 and respective actuator 24, and to control valve 25 utilizing servocontrol 26.

Pressure sensor 17 monitors the difference in pressure between delivery branch 19 and return branch 20, and controls control valve 18 to drain fluid into tank 16 when the pressure difference exceeds a designated or given threshold value. It should be appreciated that this is a precautionary measure to prevent a dangerous build-up in pressure along delivery branch 19.

Control system 21 comprises a control unit 28; a control member 29, normally a joystick; a selector 30; and a speed sensor 31.

Control unit 28 is connected to internal combustion engine 3 to acquire the speed of internal combustion engine 3; and to blocks 27 of valves 25 to sense the flow rates from valves 25 to actuators 24 and to control servocontrols 26.

Functionally, in fact, blocks 27, though integrated in respective valves 25, also form an integral part of control system 21.

In an embodiment not shown in the drawings, each hydraulic assembly comprises only one actuator and one valve.

In actual use, control system 21 controls operation of snow groomer 1, as regards use of attachments 8, to optimize energy consumption of groomer 1. More specifically, control system 21 controls positioning of attachments 8 with respect to frame 2; calculates a total flow rate demand of hydraulic assemblies 15; and controls delivery from variable-flow pump 14 accordingly. In one embodiment of the present disclosure, control system 21 controls variable-flow pump 14 so that the delivery from variable-flow pump 14 substantially, and in fact, approximately equals total flow rate demand.

Control system 21 determines the flow rates between valves 25 and actuators 24 using blocks 27; and, using control unit 28, accordingly calculates the total flow rate demand of hydraulic assemblies 15.

Attachments 8 are operator-controlled using control member 29, which supplies control unit 28 with a control signal related to, in fact indicating, the desired flow rates between valves 25 and actuators 24; and control unit 28 calculates the total flow rate demand of hydraulic assemblies 15 as a function of the control signals related to the desired flow rates.

Control member 29 in the example shown is a joystick, which can assume or be positioned in a plurality of operating positions within a designated or given range; and the control signal indicating the desired flow rates between valves 25 and actuators 24 depends on the operating position of control member 29. In other words, control member 29 regulates the desired flow rates and, therefore, the operating speed of actuators 24 within a designated or given operating speed range.

In other words, control system 21 acquires the sensed and desired flow rates at a designated or given instant; and immediately determines the total flow rate demand accordingly, to carry out the operator-requested operations.

In a variation of the present disclosure (not shown), the control unit calculates total flow rate demand on the basis of the desired flow rates only, and more specifically as substantially the sum of the desired flow rates.

In another variation of the present disclosure (not shown), the control unit calculates total flow rate demand on the basis of the sensed flow rates only, and more specifically as substantially the sum of the sensed flow rates.

At least one of the operating speed range limits can be adjusted by the operator using selector 30, which, in one embodiment, reduces total flow rate demand by a designated or given percentage. That is, selector 30 reduces each desired flow rate so that the reduction is not made at the expense of the actuator 24 with the higher resistive load. For example, each desired flow rate is reduced by the same percentage.

In another embodiment of the present disclosure, total flow rate demand varies with the travelling speed of snow groomer 1. In the example shown, total flow rate demand increases alongside an increase in travelling speed, so that the operating speed of the attachments is related to travelling speed. Operation-wise, control system 21 senses the travelling speed of snow groomer 1, and recalculates the total flow rate demand of hydraulic assembly 15 (e.g., recalculates the desired flow rates), accordingly.

In one embodiment, variable-flow pump 14 is characterized by a maximum delivery, which depends on its construction and dimensional characteristics and its operating speed. In the example shown, the operating speed of variable-flow pump 14 is related to the speed of internal combustion engine 3.

Control unit 28 acquires the operating speed of variable-flow pump 14 to determine its maximum delivery.

Control unit 28 compares the total flow rate demand with the maximum delivery, and, if total flow rate demand exceeds maximum delivery, recalculates total flow rate demand to equal maximum delivery, by reducing the desired flow rate of each actuator 24 so that the reduction is not made at the expense of the actuator 24 with the higher resistive load. For example, each desired flow rate is reduced by the same percentage.

In an alternative embodiment of the present disclosure (not shown), the control member is connected directly to the valves, as opposed to the control unit, and acts directly on the valves to regulate the desired flow rate. The control unit senses the delivery from the valves, and calculates total flow rate demand accordingly. More specifically, total flow rate demand is substantially equal to the total sensed delivery, and may be recalculated on the basis of the travelling speed of the groomer, the operator selector settings, and the maximum delivery by the variable-flow pump, as in the previous embodiment.

Accordingly, variable-flow pump 14 can be regulated in three ways:
  by closed-loop control as a function of sensed flow rates only; that is, the control system acquires the sensed flow rates, calculates a total flow rate demand substantially equal to the sum of the sensed flow rates, and acts on the variable-flow pump to deliver the calculated total flow rate demand;
  by open-loop control as a function of desired flow rates only; that is, the control system acquires the desired flow rates, calculates a total flow rate demand substantially equal to the sum of the desired flow rates, and acts on the variable-flow pump to deliver the calculated total flow rate demand; and
  by closed-loop control as a function of sensed flow rates and desired flow rates; that is, control system 21 acquires the sensed and desired flow rates, compares them, determines total flow rate demand from the comparison, and acts on variable-flow pump 14 to deliver the total flow rate demand.

The present disclosure also extends to embodiments not described in the above detailed description, and to equivalent embodiments within the protective scope of the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A snow groomer comprising:
  a snow groomer frame;
  an internal combustion engine;
  at least one snow groomer attachment movably connected to the snow groomer frame;
  at least one hydraulic assembly including:
    at least one actuator configured to position the at least one snow groomer attachment with respect to the snow groomer frame, and
    at least one valve configured to control the at least one actuator;
  a variable-flow pump including a regulating device configured to regulate the variable-flow pump to adjust an amount of flow delivery outputted from the variable-flow pump between a minimum flow rate and a maximum flow rate, said adjustment being independent of a speed of the internal combustion engine, said variable-flow pump configured to supply the at least one hydraulic assembly; and
  a snow groomer control system configured to:
    (i) calculate a total flow rate demand of the at least one hydraulic assembly by sensing a flow rate, and
    (ii) control the variable-flow pump as a function of the calculated total flow rate demand of the at least one hydraulic assembly, wherein the regulating device is driven by a regulating signal based on the function of the calculated total flow rate demand to regulate a displacement of the variable-flow pump to adjust the amount of flow delivery outputted from the variable-flow pump to be approximately equal to the calculated total flow rate demand of the at least one hydraulic assembly.

2. The snow groomer of claim 1, wherein the snow groomer control system includes a block associated with the at least one valve and configured to sense the flow rate between the at least one valve and the at least one actuator, the snow groomer control system being configured to calculate the total flow rate demand as a function of the flow rate sensed by the block.

3. The snow groomer of claim 1, wherein the snow groomer control system includes a control member configured to control the at least one snow groomer attachment and configured to supply a control signal related to a designated flow rate between the at least one valve and the at least one actuator, the snow groomer control system being configured to calculate the total flow rate demand on the basis of the supplied control signal.

4. The snow groomer of claim 3, wherein the control member is configured to be positioned in a plurality of positions within a designated range, and the control signal is a function of the position of the control member.

5. The snow groomer of claim 1, wherein the snow groomer control system includes a selector configured to produce a choke signal, the snow groomer control system being configured to reduce the total flow rate demand based on the produced choke signal.

6. The snow groomer of claim 1, wherein the snow groomer control system includes a speed sensor configured to sense a travelling speed of the snow groomer, the snow groomer control system being configured to calculate the total flow rate demand based on the sensed travelling speed.

7. The snow groomer of claim 1, wherein the variable-flow pump is associated with a maximum delivery, the snow groomer control system being configured to compare the total flow rate demand with the maximum delivery, and to reduce the flow rate between the at least one valve and the at least one actuator so the total flow rate demand approximately equals the maximum delivery.

8. The snow groomer of claim 1, which includes:
  a plurality of snow groomer attachments movably connected to the snow groomer frame, and
  a plurality of hydraulic assemblies configured to position the snow groomer attachments with respect to the snow groomer frame,
  wherein the snow groomer control system is configured to calculate the total flow rate demand of the plurality of hydraulic assemblies.

9. A method of controlling a snow groomer including an internal combustion engine, said method comprising:
  using a hydraulic assembly to position at least one snow groomer attachment moveably connected to a frame of the snow groomer, the hydraulic assembly including:
    at least one actuator configured to position the at least one snow groomer attachment, and
    at least one valve configured to control the at least one actuator;
  using a variable-flow pump to supply the hydraulic assembly, said variable-flow pump including a regulating device configured to regulate the variable-flow pump to adjust an amount of flow delivery outputted from the variable-flow pump between a minimum flow rate and a maximum flow rate, said adjustment being independent of a speed of the internal combustion engine;
  calculating a total flow rate demand of the hydraulic assembly by sensing a flow rate; and controlling the variable-flow pump as a function of the calculated total flow rate demand of the hydraulic assembly, wherein controlling the variable-flow pump includes varying a displacement of the variable-flow pump, based on a regulating signal, to adjust the amount of flow delivery outputted from the variable-flow pump to approximately equal the calculated total flow rate demand of the hydraulic assembly.

10. The method of claim 9, which includes sensing the flow rate between the at least one valve and the at least one actuator, wherein calculating the total flow rate demand of the hydraulic assembly includes calculating the total flow rate demand as a function of the sensed flow rate.

11. The method of claim 9, which includes supplying a control signal related to a designated flow rate between the at least one valve and the at least one actuator, wherein calculating the total flow rate demand of the hydraulic assembly includes calculating the total flow rate demand based on the supplied control signal related to the designated flow rate.

12. The method of claim 11, which includes using a control member to control said at least one snow groomer attachment and sensing a plurality of positions of the control member within a designated range, the supplied control signal being a function of the sensed positions.

13. The method of claim 9, which includes using a selector to supply a choke signal and reducing the total flow rate demand based on the supplied choke signal.

14. The method of claim 9, which includes sensing a travelling speed of the snow groomer, wherein calculating the total flow rate demand of the hydraulic assembly includes calculating the total flow rate demand based on the sensed travelling speed.

15. The method of claim 9, wherein the variable-flow pump is associated with a maximum delivery and the method includes comparing the total flow rate demand with the maximum delivery; and reducing the total flow rate demand to approximately equal the maximum delivery.

16. The method of claim 9, wherein the snow groomer includes a plurality of snow groomer attachments movably connected to the frame of the snow groomer, and a plurality of hydraulic assemblies configured to position the snow groomer attachments with respect to the frame of the snow groomer and which includes calculating the total flow rate demand of the plurality of hydraulic assemblies.

17. The method of claim 16, which includes reducing the flow rates of each hydraulic assembly.

18. A snow groomer comprising:
a snow groomer frame;
an internal combustion engine;
a first track;
a first drive wheel connected to the first track;
a second track, said second track being independent of the first track;
a second drive wheel connected to the second track;
a hydraulic drive configured to power the first drive wheel and the second drive wheel;
at least one snow groomer attachment movably connected to the snow groomer frame;
at least one hydraulic assembly including:
at least one actuator configured to position the at least one snow groomer attachment with respect to the snow groomer frame, and
at least one valve configured to control the at least one actuator;
a variable-flow pump including a regulating device configured to regulate the variable-flow pump to adjust an amount of flow delivery supplied from the variable-flow pump to the at least one hydraulic assembly between a minimum flow rate and a maximum flow rate, said adjustment being independent of a speed of the internal combustion engine; and
a snow groomer control system configured to:
(i) calculate a total flow rate demand of the at least one hydraulic assembly by sensing a flow rate, and
(ii) control the variable-flow pump as a function of the calculated total flow rate demand of the at least one hydraulic assembly, wherein the regulating device is driven by a regulating signal based on the function of the calculated total flow rate demand to regulate a displacement of the variable-flow pump to adjust the amount of flow delivery supplied from the variable-flow pump to be approximately equal to the calculated total flow rate demand of the at least one hydraulic assembly.

19. The snow groomer of claim 18, wherein the at least one hydraulic assembly is distinct from the hydraulic drive.

20. The snow groomer of claim 18, wherein the snow groomer control system includes a block associated with the at least one valve and configured to sense the flow rate between the at least one valve and the at least one actuator, the snow groomer control system being configured to calculate the total flow rate demand based on the flow rate sensed by the block.

21. The snow groomer of claim 18, wherein the snow groomer control system includes a control member configured to control the at least one snow groomer attachment and configured to supply a control signal related to a designated flow rate between the at least one valve and the at least one actuator, the snow groomer control system being configured to calculate the total flow rate demand based on the supplied control signal.

22. The snow groomer of claim 21, wherein the control member is configured to be positioned in a plurality of positions within a designated range, and the control signal is based on the position of the control member.

23. The snow groomer of claim 18, wherein the snow groomer control system includes a selector configured to produce a choke signal, the snow groomer control system being configured to reduce the total flow rate demand based on the produced choke signal.

24. The snow groomer of claim 18, wherein the snow groomer control system includes a speed sensor configured to sense a travelling speed of the snow groomer, the snow groomer control system being configured to calculate the total flow rate demand based on the sensed travelling speed.

25. The snow groomer of claim 18, wherein the variable-flow pump is associated with a maximum delivery, the snow groomer control system being configured to compare the total flow rate demand with the maximum delivery, and to reduce the flow rate between the at least one valve and the at least one actuator such that the total flow rate demand approximately equals the maximum delivery.

26. The snow groomer of claim 18, which includes: a plurality of snow groomer attachments movably connected to the snow groomer frame, and a plurality of hydraulic assemblies configured to position the snow groomer attachments with respect to the snow groomer frame, wherein the snow groomer control system is configured to calculate the total flow rate demand of the plurality of hydraulic assemblies.

27. The snow groomer of claim 1, wherein the variable-flow pump includes a pressure sensor configured to control a control valve to drain hydraulic fluid into a tank when a pressure difference between a pressure in a variable-flow pump delivery branch and a pressure in a variable-flow pump return branch exceeds a threshold value.

28. The method of claim 9, which includes draining hydraulic fluid into a tank when a pressure difference between pressure in a variable-flow pump delivery branch and pressure in a variable-flow pump return branch exceeds a threshold value.

29. The snow groomer of claim 18, wherein the variable-flow pump includes a pressure sensor configured to control a control valve to drain hydraulic fluid into a tank when a pressure difference between a pressure in a variable-flow pump delivery branch and a pressure in a variable-flow pump return branch exceeds a threshold value.

30. The snow groomer of claim 1, which includes a pressure sensor configured to monitor a difference in pressure between a delivery branch associated with the variable-flow pump and a return branch associated with the variable-flow pump and control a control valve to drain fluid into a tank when the pressure difference exceeds a threshold value.

31. The method of claim 9, which includes:
monitoring a difference in pressure between a delivery branch associated with the variable-flow pump and a return branch associated with the variable-flow pump, and controlling a control valve to drain fluid into a tank when the pressure difference exceeds a threshold value.

32. The snow groomer of claim 18, which includes a pressure sensor configured to monitor a difference in pressure between a delivery branch associated with the variable-flow pump and a return branch associated with the variable-flow pump and control a control valve to drain fluid into a tank when the pressure difference exceeds a threshold value.

* * * * *